United States Patent
Hursey

(12) 
(10) Patent No.: US 6,721,847 B2
(45) Date of Patent: Apr. 13, 2004

(54) CACHE HINTS FOR COMPUTER FILE ACCESS

(75) Inventor: Neil John Hursey, Hertford Heath (GB)

(73) Assignee: Networks Associates Technology, Inc., Santa Clara, CA (US)

(*) Notice: Subject to any disclaimer, the term of this patent is extended or adjusted under 35 U.S.C. 154(b) by 284 days.

(21) Appl. No.: 09/785,421

(22) Filed: Feb. 20, 2001

(65) Prior Publication Data

US 2002/0116577 A1 Aug. 22, 2002

(51) Int. Cl.[7] .............................................. G06F 12/00
(52) U.S. Cl. ...................... 711/118; 711/154; 711/213; 711/217; 711/221; 707/2; 707/3; 707/4; 707/205; 712/205
(58) Field of Search ........................ 707/2, 3, 4, 205; 711/118, 137, 146, 154, 158, 213, 217, 221, 156; 712/205; 710/16, 19, 54, 55; 714/47

(56) References Cited

U.S. PATENT DOCUMENTS

| | | | | |
|---|---|---|---|---|
| 5,454,103 A | * | 9/1995 | Coverston et al. | 707/205 |
| 5,832,526 A | * | 11/1998 | Schuyler | 707/205 |
| 6,085,193 A | * | 7/2000 | Malkin et al. | 707/10 |
| 6,240,488 B1 | * | 5/2001 | Mowry | 711/128 |
| 6,289,334 B1 | * | 9/2001 | Reiner et al. | 707/3 |
| 6,345,266 B1 | * | 2/2002 | Ganguly et al. | 707/1 |
| 6,397,206 B1 | * | 5/2002 | Hill et al. | 707/2 |
| 6,470,360 B1 | * | 10/2002 | Vaitheeswaran | 707/205 |

* cited by examiner

*Primary Examiner*—Donald Sparks
*Assistant Examiner*—Christian P. Chace
(74) *Attorney, Agent, or Firm*—Nixon & Vanderhye, P.C.; Christopher J. Hamaty

(57) ABSTRACT

An application program (6) may issue a file access request to an operating system (4) accompanied by a caching hint. This caching hint may be selected in dependence upon the file type and file size of the computer file to which access has been requested. The data defining which hint type is to be used for each combination of file type and file size may be adaptively updated depending upon measured performance for the different hint types. The hint defining data may be initialised in dependence upon the operating system version and the installed memory size of the computer system concerned.

27 Claims, 5 Drawing Sheets

| HINT TYPE | # TESTS | DATA READ | TIME | RATE | SEL |
|---|---|---|---|---|---|
| SEQUENTIAL | 3 | 102 | 64 | 1.59 | ✗ |
| RANDOM | 3 | 97 | 57 | 1.70 | ✓ |
| NONE | 3 | 114 | 81 | 1.41 | ✗ |
| NO HINT | 3 | 85 | 72 | 1.18 | ✗ |

1

| HINT TYPE | # TESTS | DATA READ | TIME | RATE | SEL |
|---|---|---|---|---|---|
| SEQUENTIAL | 3 | 102 | 64 | 1.59 | ✗ |
| RANDOM | 3 | 97 | 57 | 1.70 | ✓ |
| NONE | 3 | 114 | 81 | 1.41 | ✗ |
| NO HINT | 3 | 85 | 72 | 1.18 | ✗ |

FILE TYPE

| | *.exe | *.com | *.doc | *.htm |
|---|---|---|---|---|
| 0-1K | Serv ~<br>Ran ~<br>None ~ } ①<br>No Hint ~ | | | |
| 1-2K | | | | |
| 2-4K | | | | |
| 4-8K | | | | |
| 8-16K | | | | |
| 16-32K | | | | |
| 32-64K | | | | |
| 64-128K | | | | |
| 128-256K | | | | |
| 256-512K | | | | |
| 512-1M | | | | |
| 1-2M | | | | |
| 2-4M | | | | |
| 4-8M | | | | |
| >8M | | | | |

SIZE

FIG. 2

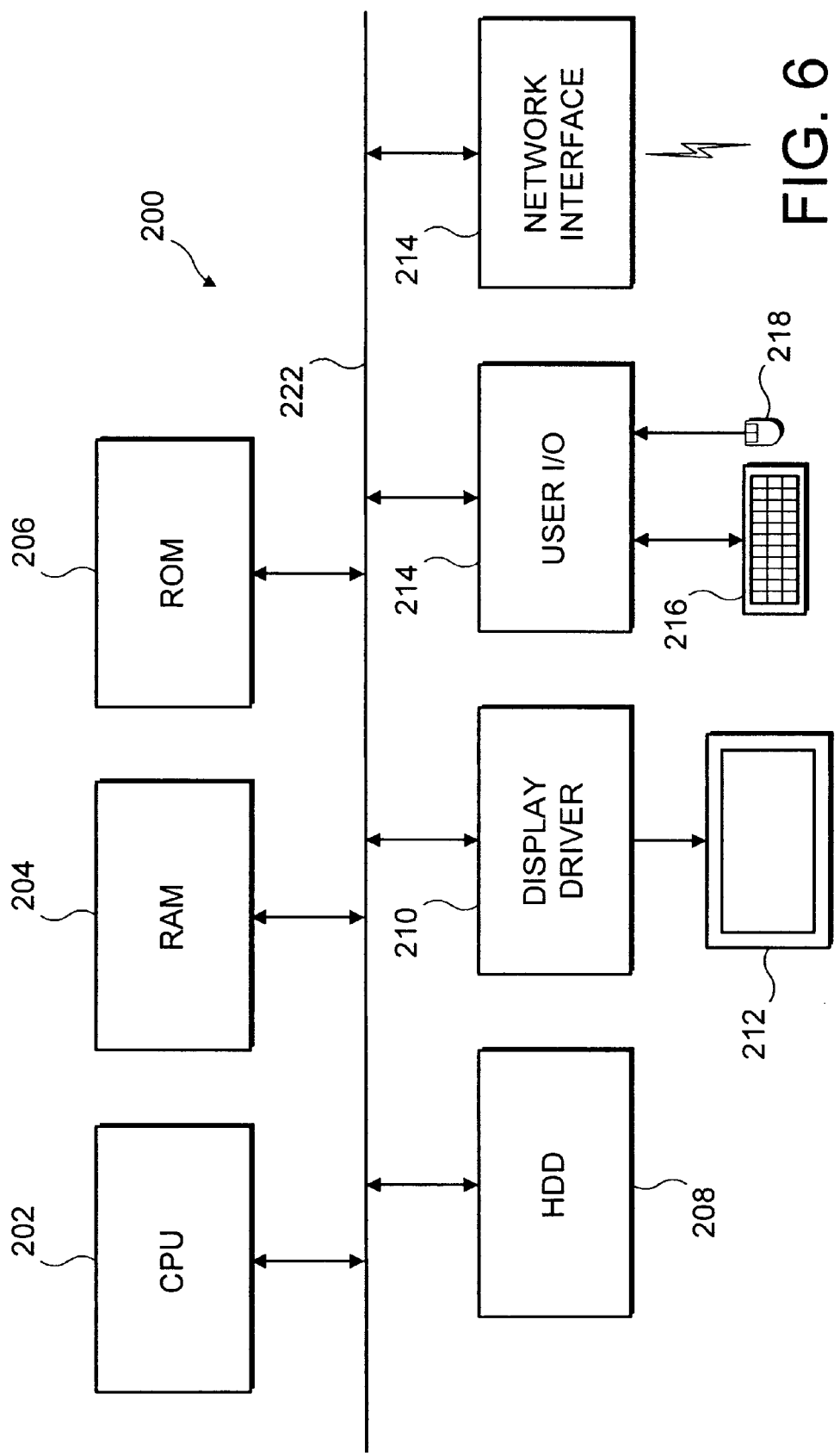

CACHE HINTS FOR COMPUTER FILE ACCESS

BACKGROUND OF THE INVENTION

1. Field of the Invention

This invention relates to the field of data processing systems. More particularly, this invention relates to the provision of cache hints to an operating system when requesting the operating system to make a file access.

2. Description of the Prior Art

It is known for the various versions of the Windows operating system produced by Microsoft Corporation to provide file caching functionality. This functionality broadly speaking is that when a file access to disk is made then more than the immediatley required data may be read from the disk and stored within the random access memory of the system on the assumption that it will subsequently be required. This caching strategy has the advantage that should a subsequent access to cache data occur then that access can be serviced more rapidly from memory than would be the case from disk and the time spent initially setting up the first access to the data held on the disk does not have to be repeated.

In order to assist this cache functionality to perform in an improved fashion, it is known to provide a "caching hint" when an application opens a file. The caching hint is an indication to the operating system of how the application intends to use the file and the operating system can respond by performing caching and allocated cache resources in a way that suits the intended use and the existing state of the system. Within the Windows operating system the four types of caching hint currently supported are:

sequential access (the file is intended to be read sequentially);

random access (the file is intended to be read randomly);

no caching (the operating system should not use any caching); and no hint (the operating system should itself decide the best caching strategy).

Known application programs that exploit this functionality, such as the McAfee virus scanner engine hard code the cache hint to be used. In the case of the McAfee virus scanner engine this always uses sequential cache hints.

Measures that can improve system performance are strongly advantageous.

SUMMARY OF THE INVENTION

Viewed from one aspect the present invention provides a computer program product comprising a computer program operable to control a computer to access a computer file, said computer program comprising:

(i) file characterising logic operable to detect at least one characteristic of said computer file;

(ii) cache hint selecting logic operable in dependence upon said at least one characteristic to select from among a plurality of different possible cache hints a selected cache hint to use in association with said access to said computer file; and (iii) file access request issuing logic operable to issue to an operating system a file access request for said computer file accompanied by said selected cache hint.

The invention recognises that hard coding a particular caching hint into a program is often sub-optimal. In particular, a cache hint that may be appropriate to a file access of a certain type of file of a certain size may not be appropriate to a file having different characteristics. Hard coding specific cache hints for every possible individual file access is also not practical in many situations where the files to be accessed cannot be predicted in advance. An example of such a situation is a computer virus scanner where the files to be scanned for computer viruses can have any file name and widely varying file characteristics. In order to address these problems the invention takes an active approach to cache hint determination and detects one or more characteristics of the file to be accessed and then selects the cache hint to be used independence upon that detected characteristic. This avoids hard coding a single cache hint for all file accesses so enabling them to be better matched to the particular circumstances and yet avoids the open ended task of trying to store an individual cache hint for every possible computer file to be accessed.

Whilst the cache hint selecting logic could be static and predefined, in preferred embodiments of the invention it is responsive to hint defining data that is adapted in use in dependence upon measured file access performance. Making the cache hint selection adaptive in this way enables it to be more accurately matched to the particular configuration and performance of the system on which it is operating and possibly also to track changes in that system that affect the performance.

The hint defining data may be arranged in many different ways, but a particularly suitable arrangement is one in which the hint defining data for each possible combination of one or more characteristics of the computer file provides data measuring the file access performance for each of the possible different cache file hints. A selection can then be made based upon which cache file hint is measured to give the best performance.

In order to avoid false measurements being made that could adversely affect the accuracy of the selected cache hint, preferred embodiments of the invention only update the hint defining data for files that are determined not already to be cached as already cached files could distort the measurements.

In order to allow the system to perform at a higher performance level from the outset preferred embodiments initialise the hint defining data based upon configuration characteristics of the computer upon which the file access request is to be made. The characteristics used for this initialisation selection may be the operating system type and the installed memory size.

Viewed from other aspects the invention also provides a method for accessing a computer file and an apparatus for accessing a computer file.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates a table storing cache hint data;

FIG. 6 is a diagram schematically illustrating the architecture of a general purpose computer that may be used to implement the above described techniques.

DESCRIPTION OF THE PREFERRED EMBODIMENTS

Figures 1, 3:
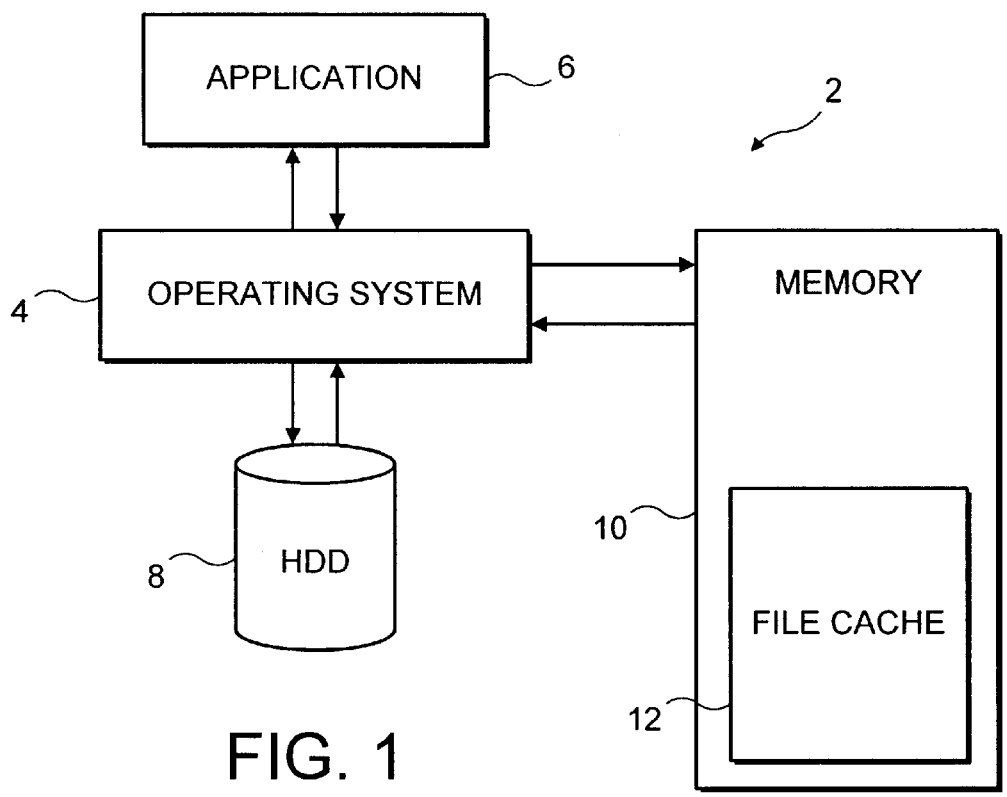
FIG. 1 schematically illustrates the relationship between an application, an operating system, a hard disk drive and a random access memory.
FIG. 3 illustrates a table entry in the table of FIG. 2.

FIG. 1 illustrates a computer system 2 which includes an operating system 4 an application program 6, a hard disk drive 8 and a random access memory 10. In operation the application program 6 may issue a file access request to the operating system 4. This file access request may be accompanied by a cache hint. The operating system 4 retrieves the requested portion of the computer file from the hard disk drive 8 and returns it to the application program 6. Depending upon the cache hint and the state of the system as a whole, the operating system 4 may retrieve more than the immediately required data and store it in a file cache 12 within the random access memory 10. If a subsequent file access request is made to data stored within this file cache 12, then that request may be serviced directly from the file cache 12 instead of having to incur the overhead of a relatively slow access to the hard disk drive 8.

FIG. 2 illustrates hint defining data. This may be considered to take the form of a two-dimensional array with each cell corresponding to a different computer file type and different file size. The computer file type and the file size are characteristics found to correlate well with choosing the best cache hint for a particular computer file. The nature of the characteristics of the computer file used for selection of the cache hint could vary depending upon the application program concerned. File type and file size works well for anti virus scanner engines, but in other applications different characteristics may be more appropriate. A combination of hard coded file hints (e.g. for a virus scanners own program file) and characteristic selected file hints may also be used.

The operating system itself could perform this technique for selecting the best cache hint in which case all applications could benefit. In this case an extra dimension to the data table stored would be used, i.e. calling computer program. The caching hint would then be selected by file extension, size and application program (i.e. the requester).

FIG. 3 illustrates in more detail the data that is stored within each cell of the array of FIG. 2. For each combination of detected characteristics (i.e. file type and file size), data measuring the file access performance for each type of hint is stored. For each hint type the number of measurement tests performed, the total data read, the total time to read that data, the average rate of data retrieval and whether or not that hint is the preferred hint is all stored. In practice the average rate of data retrieval and whether or not that hint is the preferred hint may be calculated/determined on-the-fly from the other data rather than stored explicitly. Once three measurement tests have been performed for each hint type for a cell entry, then this is considered to be suitable representative of the file access performance and no further tests need be made. In the example illustrated, the highest performance hint type is random access. Accordingly, if an access request is received for an EXE computer file of less than 1 kB in size, then the random access file hint is passed to the operating system.

As examples in the context of anti computer virus scanner engines, small EXE files are unlikely to be accessed beyond the initial access request and accordingly a random access cache hint may be appropriate as it would be inefficient to spend time caching additional data as this would be most unlikely to be used in the future. Conversely, a zip file type is highly likely to need to be fully accessed as these generally need to be unzipped before they can be scanned by an anti computer virus scanner engine and accordingly the sequential access cache hint would be most appropriate. The additional up front time taken caching more data than was initially required would be more than repaid as that data was subsequently read at high speed from the random access memory 10 rather than requiring a further relatively slow access to the hard disk drive 8. Between the two cases there are a wide variety of different possibilities dependent upon the file type and the file size. The best possibilities will also be highly likely to be dependent upon the particular characteristics of the machine upon which the system is operating, e.g. the amount of available memory on that machine, the disk speed of that machine and the particular nature of the operating system on that machine. The adaptive nature of the hint defining data enables these possibilities to be taken into account and an improved caching performance achieved.

Figure 4:
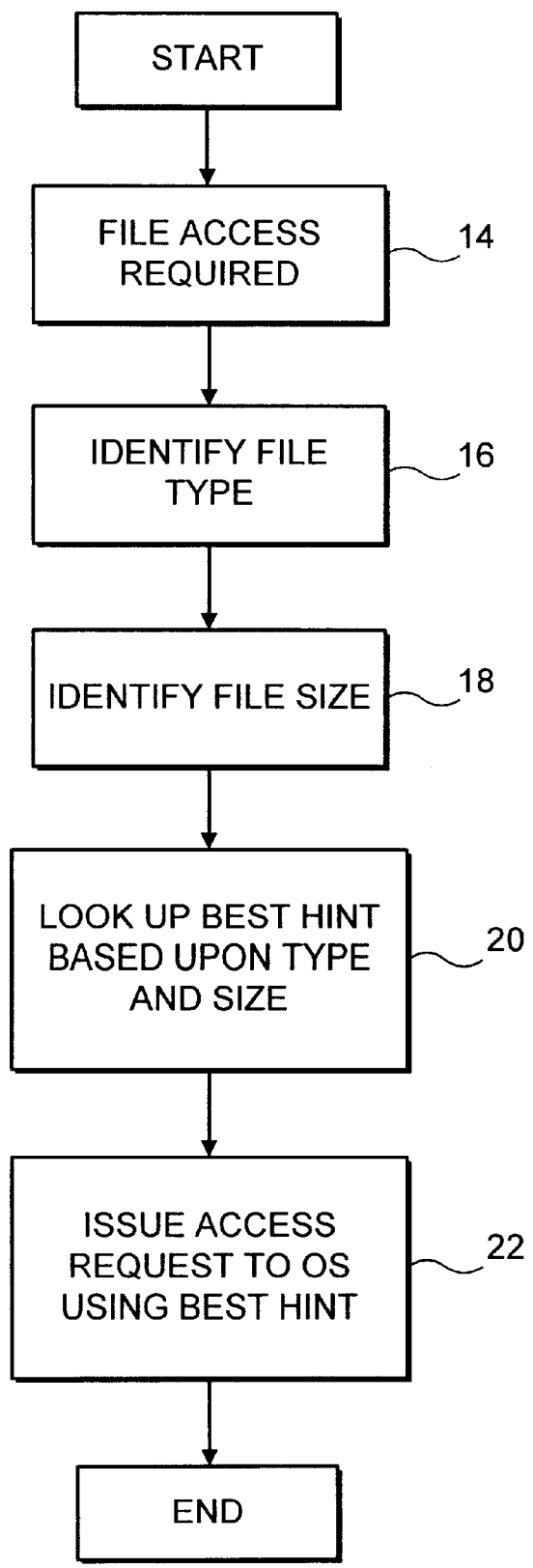
FIG. 4 is a flow diagram illustrating use of the table of FIG. 2.

FIG. 4 is a flow diagram illustrating a cache access. At step 14 the application program 6 determines that a file access request is needed. At step 16 the file type of the computer file to be accessed is identified. At step 18 the file size of the computer file to be accessed is identified.

At step 20, using the file type and the file size identified at steps 16 and 18, a lookup is made in the hint defining data illustrated in FIG. 2 to determine the currently identified best cache hint type for that combination of file characteristics.

At step 22 the identified best hint together with the file access request is passed to the operating system 4 for service.

Figure 5:
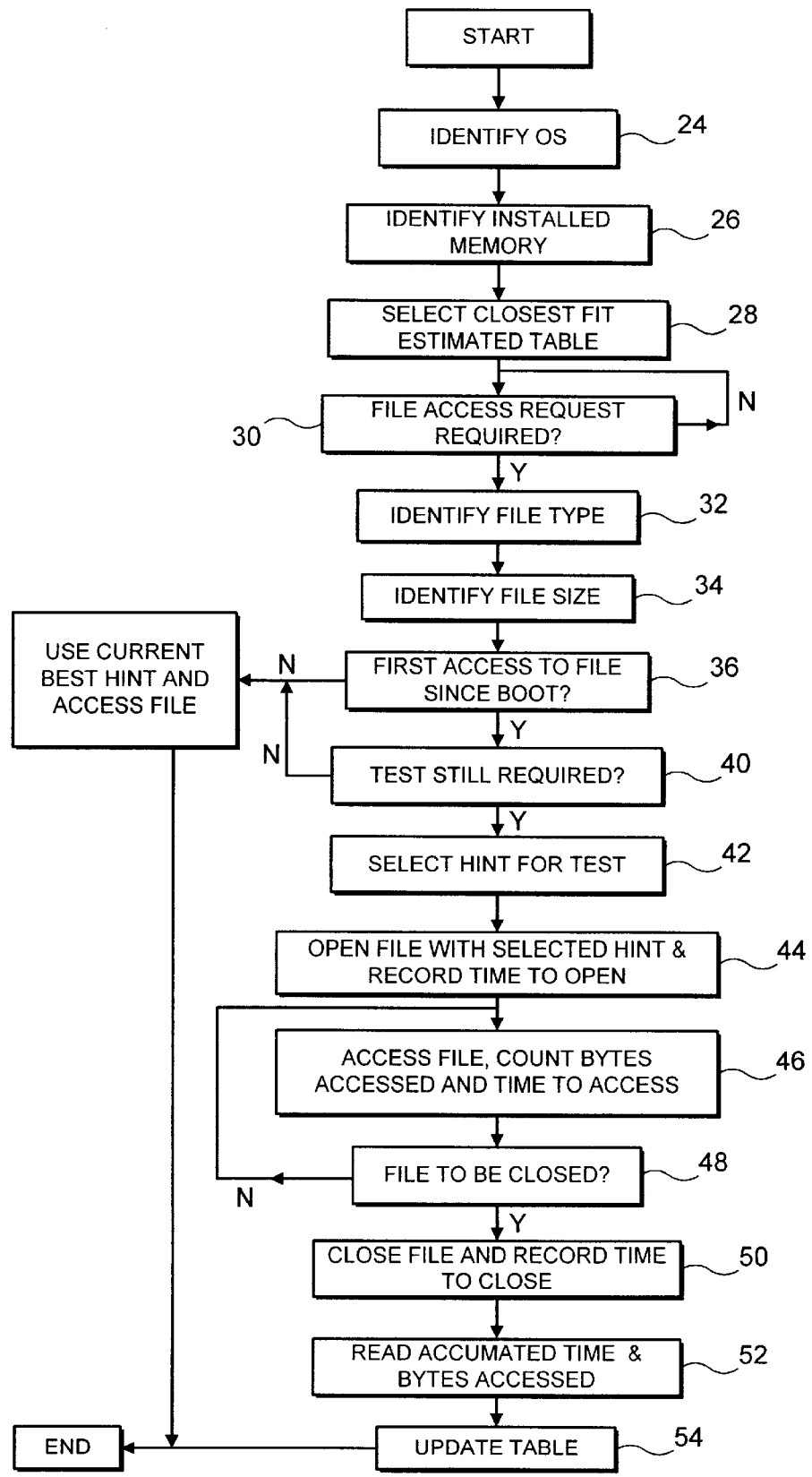
FIG. 5 is a flow diagram illustrating training of the table of FIG. 2.

FIG. 5 illustrates an example of how the hint defining data may be initialised and adapted. At step 24 upon the first running of the application program concerned the operating system is identified. At step 26 the installed amount of memory for the computer system concerned is identified. At step 28 a set of data for initialising the hint defining data is identified based upon the operating system and the installed memory.

It will be appreciated that on other than the first running of the application program the steps 24, 26 and 28 may be omitted.

At step 30 the application program conducts normal operation until a file access request is required. When a file access request is required, step 32 identifies the file type of the computer file in question and step 34 identifies the file size of the computer file in question.

Step 36 checks whether or not this is the first access to the particular computer file in question since the system was last rebooted. This check establishes whether it is possible that the computer file concerned could already be cached within the memory 10 of the system. If the access is not the first to that computer file since the last reboot, then it may produce false measurement results on which to base hint selection if file access performance were measured using that computer file and accordingly the process proceeds to step 38 where the currently indicated best hint within the hint defining data is applied. If a mechanism for checking for a first access since reboot is not available, the step 36 can be omitted at the cost of a risk of decreased accuracy.

If this is the first access to the particular computer file since the last reboot, then step 38 determines whether or not test measurement data is still required for that combination of file type and file size within the hint defining data. If enough measurement data for that particular combination has already been gathered, then processing may again proceed to step 40.

If more measurement data is required, then processing proceeds to step 42 where the hint type required for test is selected.

Steps 44, 46, 48, 50 and 52 then proceed to open the file with the selected hint type, make as many data accesses as necessary and then close the file. The time taken to open the file, make the requested file accesses and close the file is accumulated as is the total number of bytes accessed. These accumulated value can then be used to update the table at step 54 with a value indicative of the efficiency/effectiveness of the hint type selected at step 42.

FIG. 6 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 6 is merely one example of a type of computer that may execute the computer program product, method and provide the apparatus described above.

A further view of the system of an example embodiment of the invention is set out below.

The various strains of the Windows operating system have built in file caching functionality. To help the cache perform at its best, a "caching hint" can be provided when an application opens a file. The caching hint tells the OS how the application intends to use the file. Four operations are currently supported. These are:

1. Sequential Access. The file shall be read sequetnially;
2. Random Access. The file shall be read randomly;
3. No caching. The OS shall not use any caching; and
4. No Hint. The OS shall decide the best caching strategy.

Currently the McAfee virus scanner engine always uses the sequential caching hint. On average, this is the best performing cahcing hint on NT. However, the experiments have shown that these caching hints can give different results on different systems. Variations of OS and hardware configuration can alter the best hint to use. In addition, different sizes and types of file add more variables to the equation.

The purpose of the Disk Cache Optimiser (DCO) is to provide the best caching hint for every file to be scanned. Tests have shown this can speed up disk access by tens of percent.

The inconsistency in the best choice to use makes it difficult to provide the best hint. What the DCO does is tests the performance of different caching hints when files are opened and when all hints have been tried, it will provide the best caching hint for the file to be opened. This means that the DCO shall go through a short learning phase (that should be transparent to the user) before full optimisation is reached. This learning phase shall only happen once after installation, but future versions may incorporate a continuous learning feature to adapt to changes in the operating environment.

Design Considerations

Multi-Threading Issues

The DCO has to operate in a multithreaded environment. For proper operation, the following shall be implemented.

1. There shall be only one instance of the DCO for all scanning threads in operation; and
2. No updates will be allowed to the database if more than one thread is running. This has to be done instead of a semaphore as two simultaneous reads will give incorrect statistics for the learning process.

Caching Data

For the DCO to work, it needs to store information about all files to be opened. It would be impractical to store data about every file on the system. Instead we store generalised data based on file extensions and file size. The file sizes are categorised into fifteen size bands. The first band being 0 to 1024. The size of the following bands double each time. The last band being for files of –8 MB and over. (Different band sizes could be used and depending upon the situation may give better results. The choice of band size can be the subject of empirical investigation). This effectively gives a 2 dimensional array of 'pigeon-holes' for all files, indexed by file extension and file size. Each of these categories stores performance data about each of the four caching hints. The data stored is the total amount of data read using the particular caching hint, and the total time spent reading that data. In addition, there is a flag for each caching hint to indicate if a sample for the category has been read since the last re-boot. The purpose of the data shall be explained in depth later.

This is a conceptual view of how the data is stored. In practice we need two structures. One working copy-stored in memory, and a persistent copy-stored in the Windows Registry. As accessing the registry can be slow, API functions shall be provided to control when data is transferred to and from the registry.

Working Data

A array isn't the best structure to store this data as it may dynamically grow in size, and we need a fast method of searching and inserting data keyed on the file extension. To do this a binary sort tree will be used, indexed by file name extension. Each node of the tree will then contain a record with file size sub-categories (easily indexed numerically). Each sub-category shall then contain a record with the caching hint data.

Persistent Data

When the DCO DLL is not loaded, the caching data is stored in the registry. It shall be stored under the key:

\HKEY-LOCAL-MACHINE\SOFTWARE \Network Associates \Anti VirusEngine \ CacheData

The path up to, and including "Network Associates" is already created by VirusScan.

There will then be a sub-key for each file extension known to the DCO. A set of values shall then be present for each of the file size categories. The caching statistics shall be stored under these values as a comma separated list. A list of values has been chosen over further sub-categories of key to reduce the use of the registry.

The data shall be ordered as:

For each of the four caching hints Sequential, Random, Default and None:

Total data read;

Total time spent reading data; and

Number of files read.

The file extensions key values shall be stored in lower case and file size ranges as a singe 32-bit, 8 character upper case hex value (padded with leading zeros). The statistics data shall also be stored as hex, but without leading zeros.

Deciding the Best Caching Hint to Use

When the calling application makes a request to open a file and the learning phase is complete the DCO shall open the file using the best caching hint. This is calculated by looking up the performance statistics for the particular file extension and size category. The average read time is then calculated by dividing total time by the total data. The fastest cache hint is then chosen. Care must be taken here to avoid dividing by zero, or deciding to use an untested caching hint (as they appear to take no time at all!).

Learning Procedure

There are several points we must consider about the DCO learning procedure. It is important the training phase is carried out under optimum conditions as will effect the performance of the product throughout its installation period.

The DCO should not be taught on data that has been previously cached. Otherwise, the data read appears to be faster than it would normally;

What determines when enough learning has been done? Three samples of each caching hint in each category should be performed before training stops;

It should be fast; and

It should be a transparent process to the user.

After installation an initial scan should be done. During this phase most of the learning phase should be completed. The installation process should make sufficient use of the OS cache to clear most of the previously cached data. Training occurs trying different caching hints on each of the files opened. The caching hint to try is determined to be the least tested hint in the category. If two or more hints have the same testing experience, the choice is made in order of sequential, random, default and no hint.

After this initial scan most training shall be complete. However it is likely that there are used file categories and caching hints that do not have enough testing experience. These cannot be taught any further until it is known that they do not contain data in the disk cache. These remaining categories shall be taught by limiting teaching to file categories that have had no sample files since the DLL was loaded (presuming it is loaded during startup as part of the VirusScan (and variants) on access scanner ).

This means that a significant performance benefit should be gained after the initial scan, and optimum performance reached after a maximum of nine re-starts.

The DCO shall presume the first scan is taking place if the caching knowledge is not in the registry. The end of the initial scan will be indicated by the calling application using the 'WriteCacheData( )' function of the API.

Process Descriptions

Initialisation

Here the data is read from the registry to memory, and the high-resolution timer is tested for its presence. If the registry data is not present or corrupt, it shall be (re)-created. If the timer is not present, then the DCO can not operate. Under this circumstance, disk 10 commands shall be passed straight through to the OS without change.

File Opening

First the file is initially opened to determine its file size and existence. The file should be opened with the 'no caching' hint option to minimise the time it takes to open the file. It is then closed. If successful, we test if we can choose the best cache hint, or in the case of training, choose the next hint to train with.

Before the specified file is opened properly, the start time is taken from the high-resolution timer. The opening time is recorded. If successful the handle and time are recorded (a list is maintained with entries for each open file). The handle is returned to the caller.

Note that when the file is opened all the parameters are passed unchanged to the 'CreateFile( )' function, with the exception of the dwFlagsAndAttributes parameter that has the caching hint flags replaced with the option required by the DCO. File will always be opened in synchronous mode.

Reading Data

The supplied handle is first checked to see if it was created via the DCO. If not, then a normal read is done and the results returned. Otherwise the requested read is done and the time duration recorded with the amount of data read. If in learning mode this data is added to the caching knowledge database.

File Closing

An attempt is made to close the file using the 'CloseHandle( )' function. If the supplied handle was supplied by the DCO, then the handle is removed from the list of open files. The result of the close operation is returned to the calling application.

Interface

The application programming interface (API) shall be provided as "C" style functions.

DCO-ERROR DCOInitialise( . . . )

Initialises the DCO by loading the caching data from the registry to a memory structure. A list of supported file extensions can also be given. If no extension list is given, then all extensions shall be supported. The wildcard '?' can be used in the list. If the list is a sub-set of the extensions used previously, then the unlisted extensions shall be removed from the caching data. This feature has been included to help control the size of the registry entries used by the application.

Some system checks are also done. These include testing the high-resolution timer, and the presence of the caching data. The DCO cannot run without the high-resolution timer. If the registry entries are not present or damaged, then they shall be (re )-created.

Extensions can be a maximum of 3 characters in length.

Extensions are case insensitive.

Return Value

This function shall return one of the following error codes. See section on 'Error Codes' for a full description.

ERR_DCO_OK;

ERR_DCO_MEMORY;

ERR_DCO_FEATURE;

ERR_DCO_REG;or

ERR_DCO_UNKNOWN.

DCO_ERROR DCOSaveData(void)

This function must be called to save the caching information in the registry. Writing to the registry can be slow, so this function would normally be called when all scanning is finished.

Return Value

This function shall return one of the following error codes. See section on 'Error Codes' for a full description.

ERR_DCO_OK;

ERR_DCO_MEMORY;

ERR_DCO_REG;or

ERR_DCO_UNKNOWN.

HANDLE DCOOpenRead( ... )

LPCTSTR lpFileName, // pointer to name of the file

DWORD dwShareMode, // share mode

LPSECURITY ATTRIBUTES lpSecurityAttributes, // pointer to security attributes

DWORD dwCreationDisposition, // how to create

DWORD dwFlagsAndAttributes, // file attributes

HANDLE hTemplateFile // handle to file with attributes to II copy

This function is called to open a file. It is called instead of the Win32 SDK function 'CreateFile( )'. It shall open files in read-only mode only and therefore doesn't have an opening mode parameter.

Return Value

A standard Windows file HANDLE type is returned to represent the open file. The value is NULL in case of an error.

BOOL DCOReadFile(

HANDLE hfile, // handle of file to read

LPVOID lpBuffer, // pointer to buffer that receives data

DWORD nNumberOfBytesToRead, // number of bytes to read

LPDWORD lpNumberOfBytesRead,// pointer to number of bytes read);

This function is called instead of the Win32 SDK 'ReadFile( )'. It differs from the original function in that it gathers performance statistics for judging the best caching hint to use.

As files must be opened in synchronous mode, the overlap parameter is not present.

Return Value

The number of bytes placed in the buffer. BOOL DCOCloseHandle(HANDLE hObject // handle to object to close);

Called instead of the Win32 SDK 'CloseHandle( )' function, this shall close the file handle and inform the DCO that the handle is no longer in use.

Return Value

If the function succeeds the return value is non-zero.

If the function fails, the return value is zero. As with 'CloseHandle( )', 'GetLastError( )' can be called to fetch extended error information.

DCO-ERROR DCODeleteCacheData(void)

This function should be called if the DCO is to be re-trained, or during the uninstall process. Its job is to remove all registry entries created by the application.

Return Value

This function shall return one of the following error codes. See section on 'Error Codes' for a full description.

ERR-DCO-OK;

ERR-DCO-MEMORY;

ERR-DCO-REG;or

ERR_DCO_UNKNOWN. Error Codes

Error Codes

Some of the above function return special error codes. They are described here:

ERR DCO OK. Success.

ERR-DCO-MEMORY. Insufficient memory.

ERR-DCO-REG. Problem accessing the registry.

ERR DCO UNKNOWN. Unknown error. --

ERR-DCO-FEATURE. Unsupported feature. Most likely the high-resolution timer is not present.

Note: The value of these codes shall be provided in an API header file.

Design Alternatives and Further Features

Supply the DCO with several predefined caching profiles that it may select from on installation. This would give it a 'head start' with the learning phase.

Allow the file size group details to be specified in the API.

Allow the Parent key of the registry data to be specified in the API.

As the DCO is only provided for Microsoft platforms, the DCO could be implemented as a COM object, reducing interface version problems and instance control over different threads.

Implement continuous learning. If the specification of the target system changes, the learnt caching information may no longer be valid. Checks could be added to see if disk reads are performing as expected, and re-learn if they are not.

Store the caching data in a file specified in the APt, rather than the registry.

Add a small utility application to view the state of the DCO. This would give stats such as expected performance gain, and how well the system has been taught.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product comprising a computer program operable to control a computer to issue a file access request to an operating system to access a computer file, said computer program comprising:

(i) file characterising logic operable to detect at least one characteristic of said computer file;

(ii) cache hint selecting logic operable in dependence upon said at least one characteristic to select from among a plurality of different possible cache hints a selected cache hint to use in association with said access to said computer file; and (iii) file access request issuing logic operable to issue to said operating system said file access request for said computer file accompanied by said selected cache hint.

2. A computer program product as claimed in claim 1, wherein said at least one characteristic includes at least one of:

(i) file type; and (ii) file size.

3. A computer program product as claimed in claim 1, wherein said plurality of cache hints include at least one of:

(i) sequential access;

(ii) random access;

(iii) none; and (iv) no hint.

4. A computer program product as claimed in claim 1, wherein said cache hint selecting logic is responsive to hint defining data dependent upon measured file access performance.

5. A computer program product as claimed in claim 4, wherein for each combination of said one or more characteristics of said computer file, said hint defining data stores data measuring file access performance for each of said plurality of different cache file hints.

6. A computer program product as claimed in claim 4, wherein said data measuring file access performance includes data defining a rate of data access achieved using each of said plurality of different cache hints.

7. A computer program product as claimed in claim 4, wherein said hint defining data is only updated based upon caching in accordance with a cache hint to be tested and performance measurements for a file determined not already to be cached.

8. A computer program as claimed in claim 4, wherein said hint defining data is initialised prior to measured performance data being available with data selected in dependence upon configuration characteristics of said computer.

9. A computer program product as claimed in claim 8, wherein said configuration characteristics include at least one of:
   (i) operating system type; and
   (ii) installed memory size.

10. A method of accessing a computer file by issuance of a file access request to an operation system, said method comprising the steps of:
    (i) detecting at least one characteristic of said computer file;
    (ii) selecting in dependence upon said at least one characteristic to select from among a plurality of different possible cache hints a selected cache hint to use in association with said access to said computer file; and
    (iii) issuing to said operating system said file access request for said computer file accompanied by said selected cache hint.

11. A method as claimed in claim 10, wherein said at least one characteristic includes at least one of:
    (i) file type; and
    (ii) file size.

12. A method as claimed in claim 10, wherein said plurality of cache hints include at least one of:
    (i) sequential access;
    (ii) random access;
    (iii) none; and
    (iv) no hint.

13. A method as claimed in claim 10, wherein selecting step is performed in response to hint defining data depend upon measured file access performance.

14. A method as claimed in claim 13, wherein for each combination of said one or more characteristics of said computer file, said hint defining data stores data measuring file access performance for each of said plurality of different cache file hints.

15. A method as claimed in claim 13, wherein said data measuring file access performance includes data defining a rate of data access achieved using each of said plurality of different cache hints.

16. A method as claimed in claim 13, wherein said hint defining data is only updated based upon caching in accordance with a cache hint to be tested and performance measurements for a file determined not already to be cached.

17. A method as claimed in claim 13, wherein said hint defining data is initialised prior to measured performance data being available with data selected in dependence upon configuration characteristics of a computer upon which said file access request is made.

18. A method as claimed in claim 17, wherein said configuration characteristics include at least one of:
    (i) operating system type; and
    (ii) installed memory size.

19. Apparatus for accessing a computer file by issuance of a file access request to an operating system, said apparatus comprising:
    a file characteriser operable to detect at least one characteristic of said computer file;
    a cache hint selector operable in dependence upon said at least one characteristic to select from among a plurality of different possible cache hints a selected cache hint to use in association with said access to said computer file; and
    file access request issuer operable to issue to said operating system said file access request for said computer file accompanied by said selected cache hint.

20. Apparatus as claimed in claim 19, wherein said at least one characteristic includes at least one of:
    (i) file type; and
    (ii) file size.

21. Apparatus as claimed in claim 19, wherein said plurality of cache hints include at least one of:
    (i) sequential access;
    (ii) random access;
    (iii) none; and
    (iv) no hint.

22. Apparatus as claimed in claim 19, wherein said cache hint selector is responsive to hint defining data dependent upon measured file access performance.

23. Apparatus as claimed in claim 22, wherein for each combination of said one or more characteristics of said computer file, said hint defining data stores data measuring file access performance for each of said plurality of different cache file hints.

24. Apparatus as claimed in claim 22, wherein said data measuring file access performance includes data defining a rate of data access achieved using each of said plurality of different cache hints.

25. Apparatus as claimed in claim 22, wherein said hint defining data is only updated based upon caching in accordance with a cache hint to he tested and performance measurements for a file determined not already to be cached.

26. Apparatus as claimed in claim 22, wherein said hint defining data is initialised prior to measured performance data being available with data selected in dependence upon configuration characteristics of a computer upon which said file access request is made.

27. Apparatus as claimed in claim 26, wherein said configuration characteristics include at least one of:
    (i) operating system type; and
    (ii) installed memory size.

* * * * *

UNITED STATES PATENT AND TRADEMARK OFFICE
CERTIFICATE OF CORRECTION

PATENT NO.        : 6,721,847 B2                                              Page 1 of 1
APPLICATION NO.   : 09/785421
DATED             : April 13, 2004
INVENTOR(S)       : Neil John Hursey It is certified that error appears in the above-identified patent and that said Letters Patent is hereby corrected as shown below:

In the Claims:

Col. 12, line 50 replace "he" with --be--

Signed and Sealed this

Twenty-fifth Day of May, 2010

David J. Kappos
*Director of the United States Patent and Trademark Office*